Nov. 4, 1958 T. W. BRADY 2,859,339
CONTROL SYSTEMS FOR RESISTANCE WELDING APPARATUS
Filed April 20, 1953 8 Sheets-Sheet 1
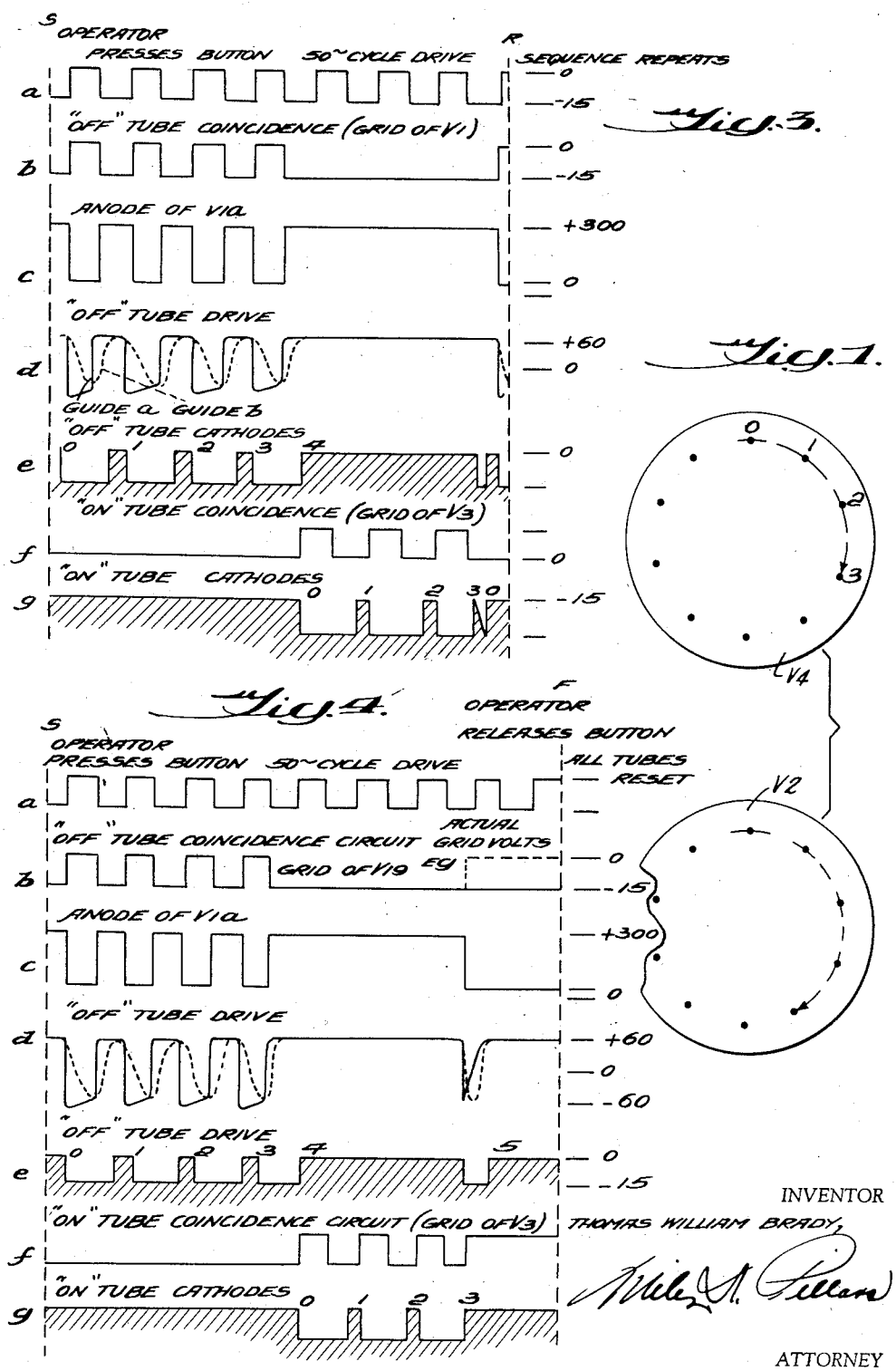
INVENTOR
THOMAS WILLIAM BRADY,
ATTORNEY

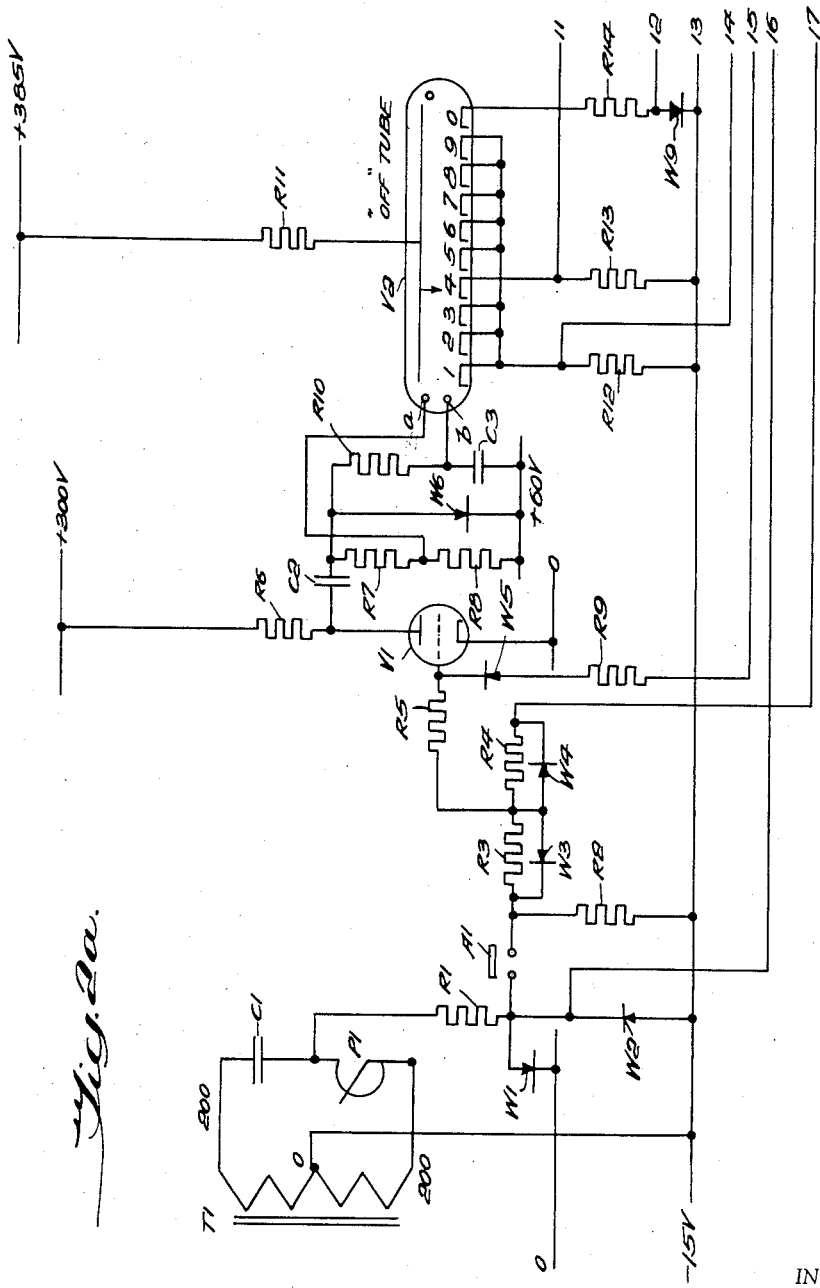

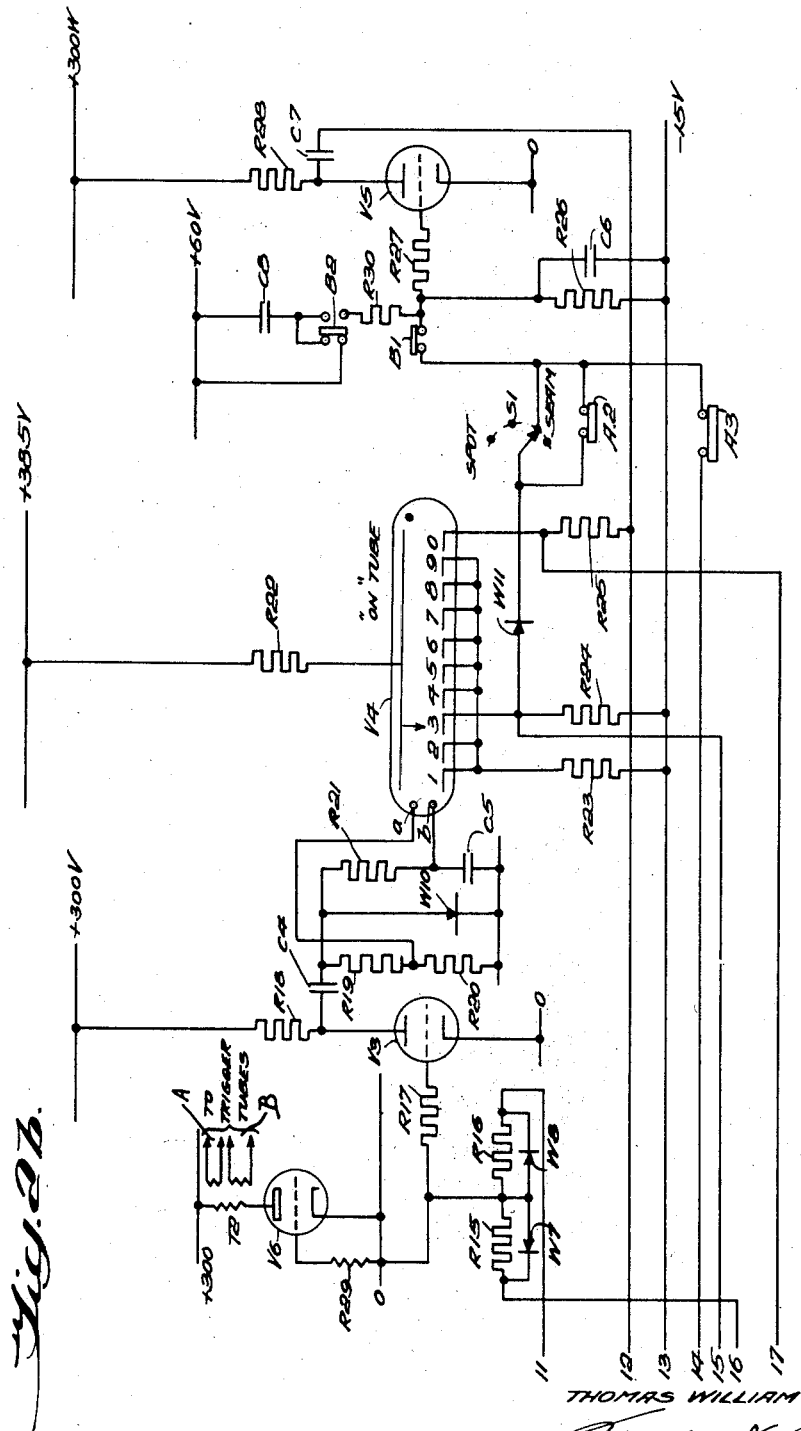

INVENTOR
THOMAS WILLIAM BRADY
BY
ATTORNEY

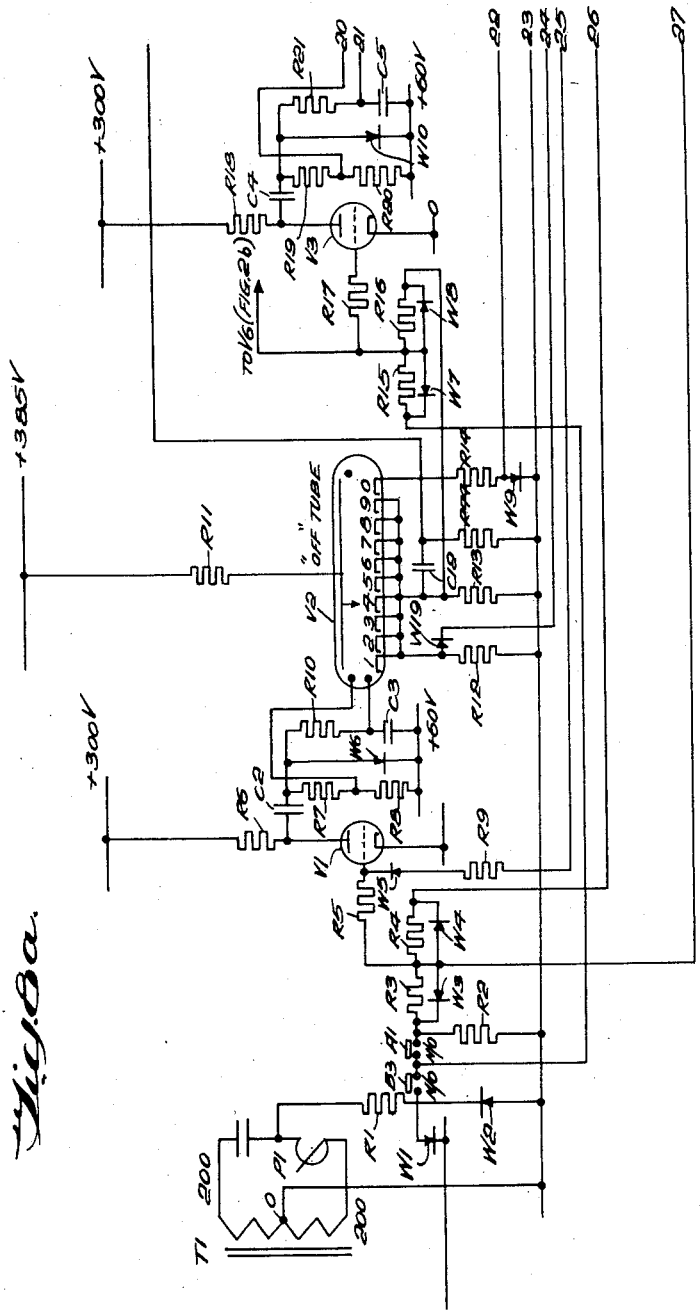

Nov. 4, 1958  T. W. BRADY  2,859,339
CONTROL SYSTEMS FOR RESISTANCE WELDING APPARATUS
Filed April 20, 1953  8 Sheets-Sheet 6
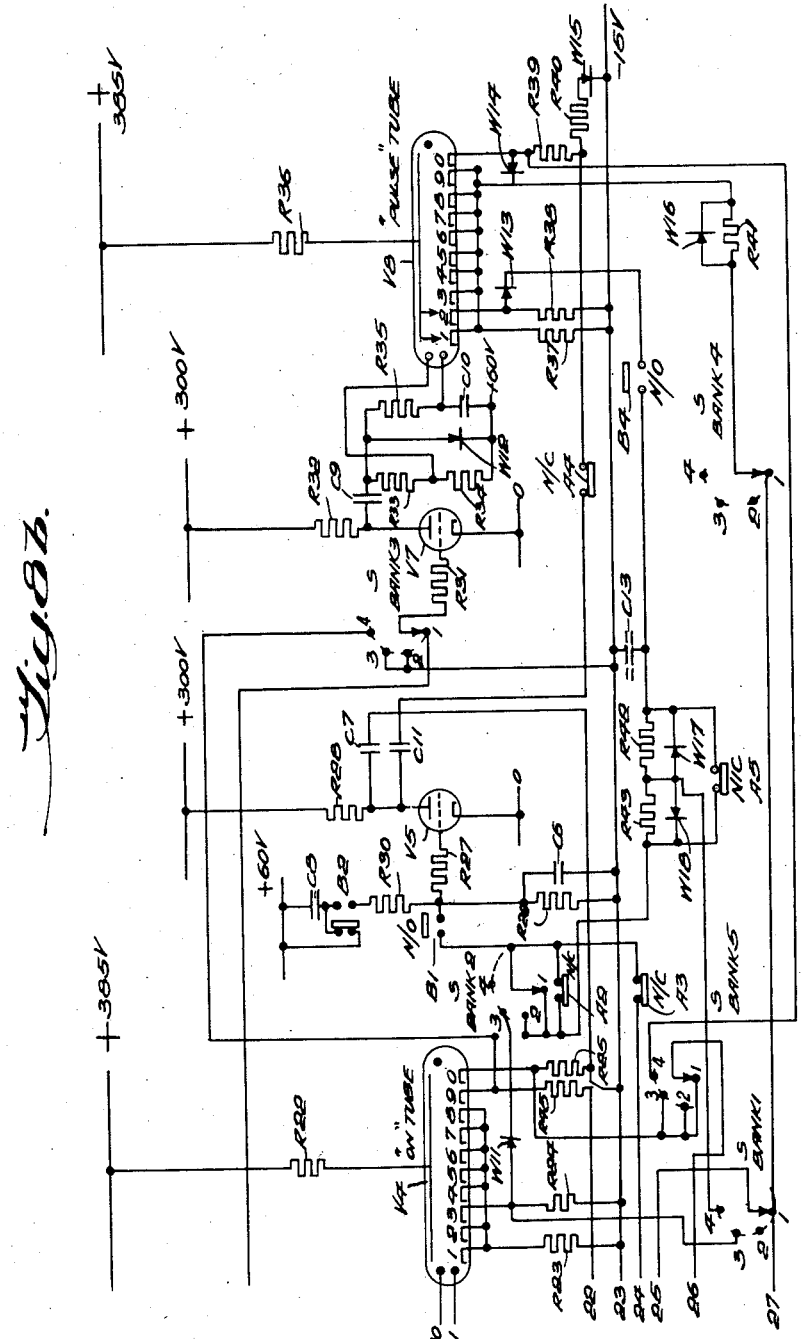
INVENTOR
THOMAS WILLIAM BRADY,
BY
ATTORNEY Nov. 4, 1958 T. W. BRADY 2,859,339
CONTROL SYSTEMS FOR RESISTANCE WELDING APPARATUS
Filed April 20, 1953 8 Sheets-Sheet 7

INVENTOR
THOMAS WILLIAM BRADY,
BY
ATTORNEY

Nov. 4, 1958  T. W. BRADY  2,859,339
CONTROL SYSTEMS FOR RESISTANCE WELDING APPARATUS
Filed April 20, 1953  8 Sheets-Sheet 8

INVENTOR
THOMAS WILLIAM BRADY,
BY
ATTORNEY

United States Patent Office 2,859,339
Patented Nov. 4, 1958

2,859,339

CONTROL SYSTEMS FOR RESISTANCE WELDING APPARATUS

Thomas William Brady, Rugby, England, assignor to The British Thomson-Houston Company Limited, a British company Application April 20, 1953, Serial No. 349,901

Claims priority, application Great Britain May 6, 1952

8 Claims. (Cl. 250—27)

This invention relates to electrical resistance welding control apparatus and more particularly to apparatus for timing the sequence of operation during an electrical resistance welding operation or a number of such operations.

An object of the invention is to make use of well-known counting tubes of the multi-cathode gas-filled glow discharge type for controlling the number of cycles of potential applied to the welding transformer during the "On" condition and the number of similar periods of time elapsing between successive "On" durations.

Throughout this specification the word "period" will have that meaning usually ascribed to it in electrical terminology. This will avoid the use of the word "cycles" when measuring intervals during which current is not flowing in the welding transformer. "Duration" will be used to denote the time taken by an "On" or "Off" condition and may comprise any number of periods.

The basic problem in electrical resistance welding is to control accurately the number of cycles of potential applied, usually at mains frequency, that is, at the frequency of the source of electrical power supply, to the primary of the welding transformer. This "On" duration and the "Off" duration between successive "On" durations during a complete welding operation may be measured in terms of periods, as defined, and for 50 C. P. S. operation are multiples of .02 second.

In known methods of controlling electrical resistance welding operations the timing of the "On" and "Off" durations is performed by "peaker" voltages. These voltages are derived from secondary windings of a saturable cored transformer, the primary input to which may be phase-displaced with reference to the supply voltage. Each of these voltages is applied to the grid of a trigger tube (usually a thyratron) which in turn fires one of a pair of reverse-coupled ignitrons. These "peaker" voltages are superimposed on the charging voltage of a resistance-capacity network. The slope of the charging voltage curve is varied by adjustment of the resistance components or the whole charging curve raised or lowered in potential. The weld can only start at the incidence of a "peaker" voltage and the weld time is terminated when the charging curve obtains the same value as that of a reference potential which it approaches in a duration determined by the two factors just mentioned. From the first active peak to the limit of charging prescribed by the condenser and the voltage applied to it is a measure of the total permissible weld time.

While the "peaker" voltages themselves may remain sensibly constant in amplitude and certainly equally spaced in time, whether a selected peak triggers or not depends to a great extent on the level to which it is raised on the charging curve. Even with very stable value resistance and capacitance components the applied voltage to the network may still vary, especially due to line fluctuations caused by the welding operation and a selected peak might not quite reach the value necessary to cause triggering. Alternatively the charging curve might obtain a value just sufficient to cause the "peaker" immediately preceding the selected one to cause early triggering. Arrangements operating on an analogue basis of counting welding cycles is inferior for this reason to the apparatus employing digital counting which the invention to be described employs.

According to the invention there is provided apparatus for controlling electric resistance welding machines comprising a source of electrical pulses and digital counting means responsive to said pulses operable to control the durations of on and off periods of welding current.

The invention will now be described with reference to the accompanying drawing which is by way of illustration only, in which Fig. 1 is a diagrammatic representation of a pair of multi-cathode gas-filled glow discharge tubes.

Figs. 2a and 2b together show a schematic diagram of a complete welding control circuit for seam or spot welding.

Figs. 3a to 3g inclusive show representative wave forms encountered in the operation of the control circuit during seam welding;

Figs. 4a to 4g inclusive show representative wave forms encountered in the operation of the control circuit during spot welding.

Fig. 5 indicates typical wave forms associated with the trigger tube drive of Fig. 2.

Figs. 6a and 6b together show a modification of the circuit illustrated by Figs. 2a and 2b arranged to control a "long spot" welding operation.

Figs. 7a to 7e inclusive show idealized wave forms encountered in the operation of the circuit shown in Fig. 6.

Figs. 8a and 8b together show a further modification arranged to control either "seam," "spot," "long spot" or "pulsation" welding operations.

Figs. 9a to 9g inclusive represent idealized wave forms for the operation of the circuit shown in Fig. 8 arranged for "pulsation" welding.

Figs. 10a to 10g inclusive represent idealized wave forms for the operation of the circuit shown in Fig. 8 arranged for "long spot" welding.

Fig. 11 is a circuit diagram of an operator's control circuit.

Basically the invention employs two multi-cathode gas-filled glow discharge tubes. Suitable tubes are the ten cathode counting tubes known by the registered trademark "Dekatron."

Two ten cathode tubes are shown diagrammatically in Fig. 1. V4 is known as the "On" tube and is arranged to step once for every period that the welding transformer is energised. The other tube V2 is called the "Off" tube and is arranged to count the periods required between the "On" durations. The tubes are together arranged to step in sequence in response to pulses at mains frequency as far as the selected cathodes corresponding to the "On" and "Off" numbers of periods. The arrival of the glow on the selected cathode of the "Off" tube provides a gating signal for the "On" tube and the glow on the zero cathode of the "On" tube provides the gating signal for the "Off" tube. At the end of the "On" duration the "On" tube provides a signal which resets both tubes to zero, the "Off" tube having remained on its selected cathode.

In the example illustrated it is assumed that the "Off" tube V2 starts first and completes the interval duration of four periods at the end of which the glow arrives on the fourth cathode and a gating signal for the "On" tube is created. As the "On" tube V4 steps from its zero or "home" cathode the gating signal for the "Off" tube is destroyed and the "Off" tube remains on its fourth cathode. The "On" tube which is preset to count three periods continues to step in response to 50 cycle/sec.

pulses derived from the mains supply. Each step now corresponds to one cycle of potential applied to the welding transformer. At the end of three periods the glow of the "On" tube comes to rest on the third cathode and a resulting signal is arranged to reset both counting tubes. The "Off" immediately begins to start counting again and the sequence is repeated as often as is desired.

A more detailed description for a seam welding operation as outlined above follows by way of explanation of Figs. 2a and 2b which show a circuit diagram of a complete control arrangement for either seam or spot welding. These two figures comprise a single system, and lines 11, 12, 13, 14, 15, 16, and 17 in the two figures are continuous line circuits therein. Switch S1 is set to contact B in the "Seam" position.

It is assumed that suitable D. C. plate supplies are available for the counting and gating tubes.

The transformer T1 supplies, through a phase-shifting network C1 and P1, single phase A. C. to a clipper circuit comprising resistance R1 and rectifiers W1 and W2. The resulting triggering voltage approximates to a square wave of 15 volts amplitude at mains frequency (assumed 50 cycle/sec.).

This voltage is continuously applied to the coincidence circuit of trigger or gate tube V3 but is prevented from triggering V3 in the absence of an unblocking potential applied to W8 from the selected cathode of the "Off" tube.

The selected cathodes, using the same example quoted above, are each marked in the figure, with an arrow over the appropriate cathode in each counting tube.

Assuming the counting tubes to be in their rest condition, that is, with the glow on the zero cathodes, the "On" tube V4 provides an unblocking signal to the gate of V1 so that when contact A1 is closed, pulses at mains frequency step the "Off" tube V2 one cathode per period.

The output pulse from V1, and similarly V3, is split into two phase-related pulses which are fed over the conductors "a" and "b" to "guides" within the multicathode tube of the type mentioned above which sequentially prime the main gaps by means of subsidiary gaps (not shown) connected to the "guides" whereby the discharge is stepped around the cathode array in sequence and constant direction. In this respect the invention is not limited to the type of tube mentioned above or to ancillary circuits necessary for the operation of that type of tube. Further, the invention is not to be limited to the use of multicathode type tubes when, quite obviously, the counting tubes may be replaced by a suitable number of separate gas-filled diodes.

When the glow arrives on cathode 4 of V2 the gate R15, R16, W7, W8, is open for pulses to step the "On" tube V4. As the glow on the zero cathode of V4 passes to cathode 1 the coincidence for the gating circuit of V2 is destroyed and the glow in V2 remains on the 4th cathode to provide a continuing coincidence for the "On" tube drive.

Four "Off" periods have now been counted and pulses applied to V4 are about to be counted as "On" periods. The gating circuit R15, R16, W7, W8, in addition to permitting pulses to step the "On" tube also permits the same pulses to trigger V6 which triggers a pair of thyratrons, connected to secondary windings A and B of transformer T2, which in turn trigger the welding ignitrons. The arrangement of ignitrons and their associated trigger tubes are well known in the art.

The required three pulses for the welding duration are counted by tube V4 and trigger V6 permits as many cycles of welding current to flow in the welding transformer as are set and counted by the "On" tube.

When the required number of cycles of welding current have been passed the counting tube V4 will have its discharge standing on cathode 3. With switch S1 in the "Seam" position a pulse is applied over W11 which triggers V5 the resulting fall in the anode potential of this tube is applied by way of condenser C7 to the zero cathodes of both counting tubes. For an instant they are both returned to normal prior to the "Off" tube commencing to step as previously, the cycle repeating for as long as the operator's button remains pressed.

When V4 is not counting V6 is not receiving any triggering pulses since the two tubes, V4 and V6, share a common gate.

On release of the operator's button the counting tubes eventually reset to zero and stop but for reasons which will be fully described later release of the operator's button during an actual welding duration will not result in a partly-completed weld.

For the sake of simplicity and economy of components the cathodes of the counting tubes, except the zero cathodes, are connected to switches (not shown) which select the required cathode of each tube, connect it, in the case of V2, to R13 and the coincidence circuit of V3; common the remainder and connect them through a common resistor, e. g. R12.

As described so far the invention has provided an exact means of counting cycles of mains potential which may be used for marking the "on" and "off" durations of the welding transformer in terms of complete integers of the supply frequency. The counting is obviously "tied" to the final triggering of the welding ignitrons since pulses which step the "on" tube synchronously fire the trigger tubes of the ignitrons. These pulses are, however, phase displaceable as previously mentioned, from the mains supply which feeds directly the welding transformer and permits "heat" control in the well known manner by advancing or retarding the firing of the welding ignitrons.

It has been found necessary to guard against false starts and asynchronous starts and finishes. Normally by starting the "off" tube first the first weld duration must be a full one. Additionally the invention makes it impossible to stop a weld duration before the selected full number of periods have been completed by the "on" tube. As these features are to some extent tied up with such manual switching which is under the control of an operator some explanation of the switching arrangement is necessary. It is assumed that the weld time controls, i. e. the counting tube selector switches are not moved during a welding operation.

On known welding control equipments apart from the mains switch, the only switch external to the equipment is the operator's weld button. A delay switch is often incorporated to give the thyratrons sufficient time to warm up and contactors are used for enabling certain circuits to be closed in sequence.

In Fig. 2 it is necessary for contact A1 to close after contacts A2 and A3 open. These contacts are under the control of the operator's button.

When the equipment is first switched on the discharges in the two counting tubes may strike on any one of the 10 gaps. To standardise both tubes the coil (not shown) of contacts B1 and B2 is energised at the end of the time delay necessary to permit the thyratrons to warm up. This serves to pulse the grid of V5 and perform the reset function in the manner previously described. The discharge in both tubes passes on to their zero cathodes and, in the case of the "off" tube, the zero cathode is ready to be stepped on receipt of the first stepping pulse when A1 closes in response to the closing of the operator's button or footswitch. A ful ldescription of the operator's circuit occurs later in connection with Fig. 11.

In seam welding the operator may release his button to which relay A responds at any time between the start and finish of the weld.

If relay A is de-energized at that instant when both counting tubes have just reset to zero, the sequence cannot proceed.

If relay A is de-energised when the "off" tube is running and before the glow has reached the selected cathode a signal is transmitted through contact A3 to valve V5 which resets the counting tubes and the sequence stops.

If relay A is de-energised when the "off" tube has reached its selected cathode or the "on" tube is running then nothing will prevent the "on" tube from finishing its run and resetting action taking place in the usual way, after which the sequence stops.

Patterns, in idealised form, of various voltages in the control circuit during a seam welding operation are shown in Fig. 3.

Fig. 3(a) shows the square wave clipped from the mains which sets the sequence for timing the whole control apparatus.

Fig. 3(b) shows the voltage at the grid of valve V1 during a 4 periods "off", 3 periods "on" sequence.

Figure 6A:
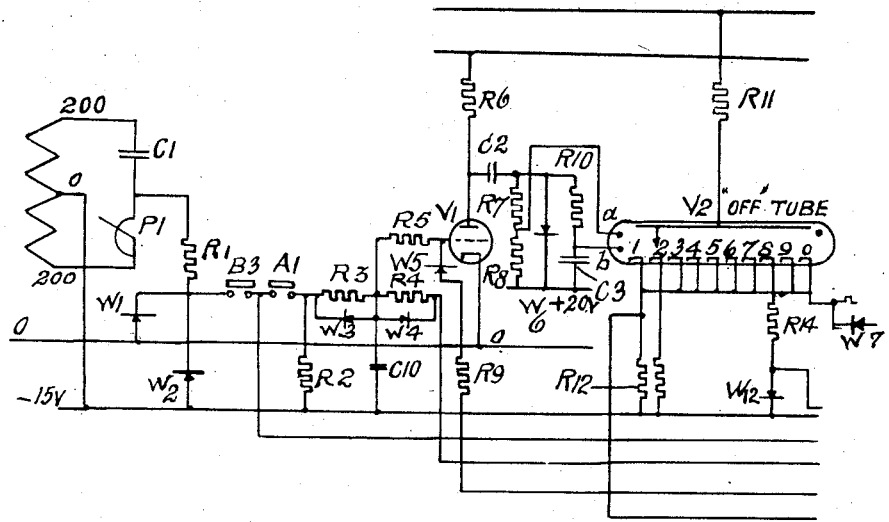

The resultant negative-going pulses at the anode of V1 are shown in Fig. 3(c) and the two supplies (marked a and b) for stepping the discharge along the cathode array of V2 are shown in Fig. 3(d) which swing approximately ±60 volts.

The "off" tube cathodes strike when both guides together obtain their most positive value as shown in Fig. 3(e). The "off" discharge remains on the selected cathode (4) until the selected "on" tube cathode just strikes as indicated by sharp pulse 3 in Fig. 3(g). As coincidence is immediately destroyed this shortened pulse is immediately succeeded by transference of the discharge of both tubes on to their zero cathodes and the sequence repeats for as long as the operator has his button pressed.

In the case of spot welding the switch S1 does not extend a pulse to the grid of V5 at the end of each "on" duration to reset both counting tubes.

The "off" tube starts as before and when its glow reaches the selected cathode, coincidence is provided which permits the "on" tube to step. When the "on" reaches its selected cathode a signal is transmitted through resistor R9 and rectifier W5 which steps the "off" tube on to its fifth cathode, the glow having remained on cathode 4 while the "on" tube was stepping, as previously in the case of seam welding. This destroys the coincidence for the "on" tube drive and the system stops with the "on" tube on cathode 3 and the "off" tube on cathode 5.

This condition remains for as long as the operating button is pressed. On release, the counting tubes are reset by a signal from V5 which is triggered by a combination of potentials derived from the commoned cathodes of the "off" tube and the selected cathode (3) of the "on" tube.

A series of wave forms for the spot welding sequence are shown in Fig. 4 which is similar to Fig. 3 except that the "Off" tube is not immediately reset at the end of the "On" duration and the sequence does not repeat itself.

Figure 5:
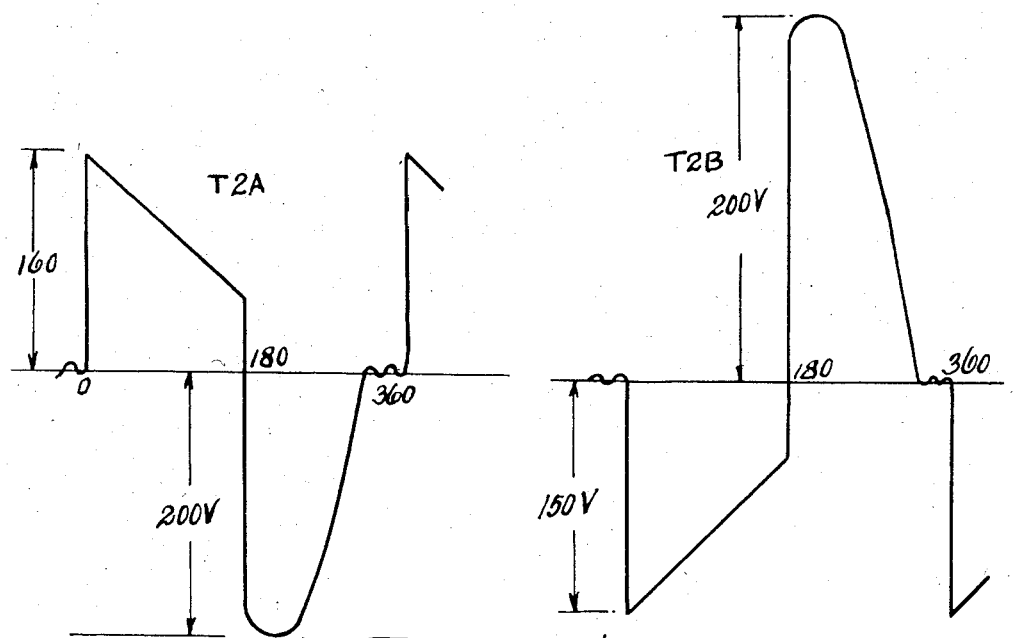

Fig. 5 shows the types of wave form characteristic of the triggering voltage supplied by the two windings, A and B, of transformer T2 (Fig. 2b). The steep fronted wave with long decay is superior to a "peaker" since the firing period is well defined at the start and is lengthened by the duration of the pulse, which prevents the ignitrons from "half-waving."

In known welding control systems the "heat" control which advances or retards the "peaker" with reference to the potential applied through a pair of reverse connected ignitrons connected in series with the welding transformer primary is limited in setting to points where no current persists in one ignitron when the voltage applied to it reverses. Since the second ignitron is in reverse parallel it actually has a negative voltage impressed across it by the first ignitron when its own firing peak occurs. When the current in the first ignitron does die away and this voltage disappears, the "peaker" voltage which should have fired the second ignitron has passed. By having firing peaks of long duration the firing condition persists until the current in either ignitron dies away and each ignitron is fired in sequence.

Thus in Fig. 5 the nature of the firing pulses produced by the invention are seen to be capable of a phase variation of almost ±90 degrees without "half-waving" and subsequent damage to the equipment.

Figure 6B:
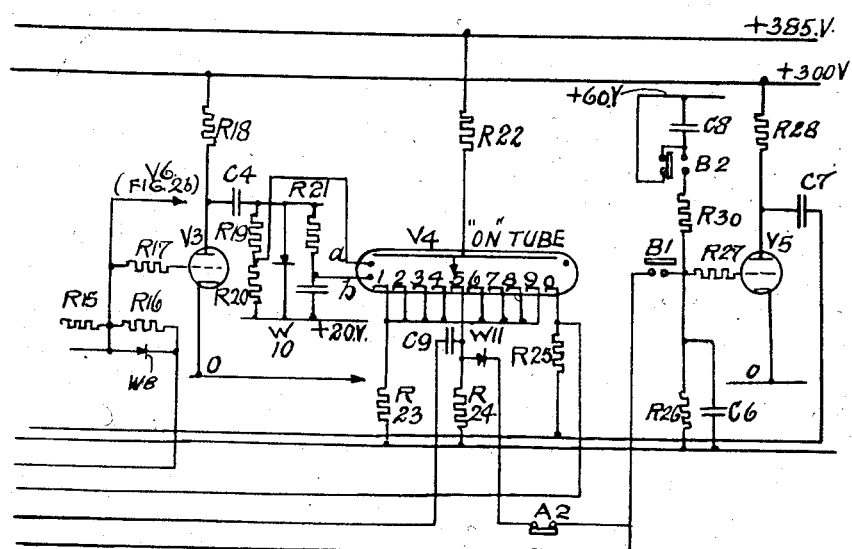

Figs. 6a and 6b comprise a single system and show a circuit, slightly modified from that shown in Figs. 2a and 2b, for controlling so-called "long spot" electric resistance welding. The circuit may be converted from that shown in Fig. 2 to that shown in Fig. 6 by suitable switching. For a clear understanding of Figs. 6a and 6b such switching is not shown but the few changes in connections necessary easily enable a single equipment to control either seam, spot or long spot welds. The switching for selecting and commoning the counting tube cathodes is omitted as before.

Contact B3 shown in series with contact A1 and the pulse source is a minor addition which ensures that an operator is prevented from energising the control circuit anew before the preceding weld has been completed, which feature may also be incorporated in the preceding scheme.

As before, coincidence for gating tube V1 is derived from cathode 0 of V4. The coincidence for gating tube V3 is derived not from the selected cathode of V2 but from its 0 cathode which is now connected in parallel with the remaining cathodes excluding the selected cathode and cathode 8. In the present example it is assumed that a weld of 25 cycles is to be controlled. For reasons which will be clearer from the following description cathode 2 is selected for V2 and cathode 5 for V4.

When the circuit is put into a condition for operation a reset pulse from V5, developed as before, is applied to the junction of R14 and W12 causing cathode 8 of V2 to strike.

When contacts A1 and B3 close in response to the operator's button being pressed or such other means, e. g. foot switch or switch operated by closure of the electrodes, the discharge in V2 is stepped from cathode 8 to cathode 9. This provides a coincidence potential for the gating circuit of V4 which starts to run and the discharge in stepping from V4 cathode 0 destroys the coincidence for V2 which immediately stops on cathode 9.

An additional capacitor C9 connected to the selected cathode of V4 is included to shorten the pulse from the selected cathode thereby ensuring that (in the example under discussion) the glow in V2 passes from cathode 9 to cathode 0 and from cathode 0 to cathode 1 before the 6th and 16th driving pulses respectively. In this respect reference may be had to curves c and e of Fig. 7. It may be noted that in the "spot" scheme the signal on the grid of V1 is not obtained until the operation is complete when transmission of the pulse from the selected cathode may take as long as it likes to mature and C9 is not essential.

The "On" tube, V4 continues to step until its discharge arrives on its selected cathode (5) during which time five control pulses trigger V6 (Fig. 2b) to permit five cycles of current to flow through the weld. As cathode 5 of V4 strikes, a pulse passes to the grid of V1 via C9, R9 and W5 which causes V2 to step from cathode 9 to cathode 0. The latter is, in this modified arrangement, connected to the commoned cathodes. The coincidence for V4 is therefore not destroyed and the tube continues to run uninterruptedly until the discharge again rests on cathode 5. So far 15 cycles of heat time have been counted out. It will be noted that although the discharge has rested momentarily on cathode 0 of V4 this is insufficient to cause a coincident condition during which a pulse through gating tube V1 can step V2 on once. The addition of a capacitor C10 delays the arrival of the driving pulse to V1 until the driving pulse moves the discharge in V4 from off its 0 cathode. This destroys the coincidence for the "Off" tube drive.

The discharge in V4 completes another circuit of its cathode array and when it arrives on cathode 5 for the third time since it started moving a pulse over C9 causes V2 to step its discharge from cathode 1 to cathode 2 at which instant the coincidence for V4 is destroyed and the discharge stops on cathode 5.

The weld being completed for the duration set the operator releases his button, contacts A and B take up their normal (unoperated) positions and a pulse from the selected cathode of V4 as contact A2 closes triggers V5 to send a reset pulse to restore counting tubes to the condition prior to controlling another weld.

Figure 7:
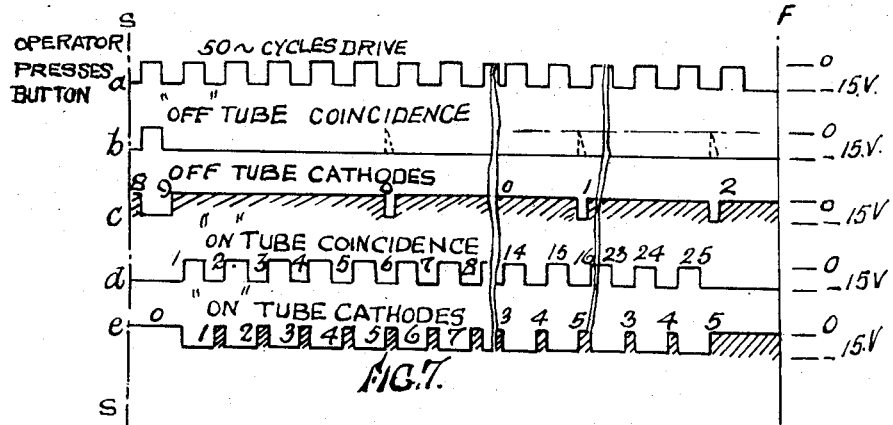

As before the sequence of tube operations is illustrated, this time by Fig. 7.

The curve $a$ sets the scale to which the control operates, that is, the 50 cycle pulses derived from the mains. The first of the pulses $a$ after the operator presses his button at the start S, puts one pulse only into V2 via its coincidence network (curve $b$) which steps V2 from cathode 8 to cathode 9 thereafter providing a continuing coincidence for V4 which permits 25 successive pulses to step V4 as indicated in curves $d$ and $e$. The short pulses which indicate V2 stepping at 5, 15 and 25 cycles are shown in curve $c$ together with the large pulse occurring at the commencement of the run.

The addition of a third counting tube for counting a number of complete welding operations results in a comprehensive welding control system suitable not only for a "spot," "seam" or "long spot" welding as has already been described, but also for "pulsation" welding.

A circuit diagram for such a comprehensive control system is illustrated by Fig. 8 and shows, additional to the two counting tubes V2 and V4 of Figs. 2a and 2b with their gating circuits and the pulse forming and delay networks, a third counting tube V8 and such additional switching as will render the circuit operable to control "pulsation," "seam," "spot" or "long spot" resistance welding operations. Switching for selecting and commoning the counting tube cathodes is again omitted from the figure.

Upon switching on and after the initial delay usually incorporated in such systems for the thyratron cathodes to attain full operating temperature, contact B2 closes followed shortly by the closing of contacts B1 and B3. This causes the reset tube V5 to pulse the 0 cathodes of counting tubes V2 and V4 as before and the 0 cathode of V8 by a pulse over capacitor 11 and contact A4 closed in preparation for the commencement of the weld.

The following description concerns the circuit illustrated by Figs. 8a and 8b arranged for pulsation welding and assumes the selector switch S, having five banks 1, 2, 3, 4, and 5, to be set in position 1. These two Figures 8a and 8b illustrate a single system and lines 20, 21, 22, 23, 24, 25, 26, and 27 in both figures are continuous line circuits therein. By way of example the weld is to comprise two "On" durations of three periods each separated by an "Off" duration of four periods.

It is to be noted that the coincidence circuit for V2 now has three arms since bank 4 connects R41 and W16 in parallel to form the third arm. The coincidence potential for this arm is derived from all the cathodes of V8 with the exception of the selected one.

When the start button is closed contacts A2, A3, A4 and A5 open followed by the closing of A1. As before, to prevent a "false start" and to ensure that the first "On" duration is a whole one, V2 commences to run and when the discharge arrives on selected cathode 4 coincidence for V2 is destroyed causing V2 to stop on cathode 4 at the same time providing coincidence for V4 which commences to count welding periods or cycles. The arrival of V2's discharge on cathode 4 is also operable to cause V8 to step once by a pulse over C12 and position 1, bank 3 of selector switch S.

The "On" tube V4, counts out 3 cycles of welding current and in doing so arrives on its selected cathode 3 when a reset pulse over W11, bank 2 position 1 triggers V5 to reset both V2 and V4 to zero as has been described with reference to Figs. 2a and 2b. V8 is no reset by V5 since contact A4 is now open. The "Off" tube, V2, runs again and when it reaches its selected cathode V4 for the second time V8 has its discharge driven on to selected cathode 2. The arrival of the discharge of V8 on cathode 2 destroys the coincidence for V2 and when V4 has stepped the desired number of times to deliver the second duration of welding cycles the sequence stops. This does not prevent the "On" and "Off" tubes, V2 and V4, from resetting in the usual manner and the timer truly comes to rest when V2 and V4 are set to zero (discharges on cathodes 0) and V8 with its discharge standing on cathode 2.

On release of the operator's button, however, V8 is also restored to zero as V5 is triggered when contacts A2 and A5 reclose to extend the potential from V8 cathode 2 to the grid of V5 contact B1 closed. The control arrangement is again in a condition to repeat a similar "pulsation" weld.

For a "seam" weld the selector switch S is set to position 2. The grid of trigger tube V7 is connected to the $-15$ v. line and the counting tube V8 therefore takes no part in the operation.

Assuming the "On" and "Off" tubes to remain set to selected cathodes 4 and 3 respectively the closing of the operator's button starts off V2 from cathode 0 when having counted four "Off" periods, V4 starts off to count out three welding cycles. For as long as the operator's button is kept closed the sequence repeats with resetting by V5 at the end of each "On" duration as previously described with reference to Figs. 2a and 2b. Also as before the random opening of the operator's button is prevented from causing a partly completed weld to occur.

For "spot" welding the selector switch is set to position 3. The grid of V7, the trigger tube for V8 is returned to the $-15$ v. line so that V8 takes no part in this operation either.

The "Off" tube starts first when the operator's button causes energisation of relay A and after the now familiar reset operation, and after completing its run starts off the "On" tube. The reset line from the selected cathode of the "On" tube is disconnected at bank 2 so that at the end of the "On" duration V5 is prevented from operating in response to the potential of V4 cathode 3 discharging. The arrival of the glow on V4 cathode 3 instead extends a signal by way of bank 1 position 3, R9 and W5 to trigger V1 and so step V2 once. The glow discharge in V2 not having been reset to cathode 0 passes from cathode 4 to cathode 5. This action destroys the coincidence for V4 and the system stops with the "On" tube discharging on cathode 3 and the "Off" tube discharging on cathode 5. The operator's button being released, contact A2 closing restores the missing connection between the "On" tube selected cathode and the grid of V5 to cause reset action as before.

For "long spot" welding the control could be effected either on a two counting tube basis similar to that described with reference to Fig. 6, in which case V8 is only brought into use for "pulsation" control, or, as is shown in Fig. 8 a third tube V8 is brought into play. Obviously the choice will be largely with the way in which the selector switch S is connected.

In the example of "long spot" welding about to be described the selected cathode of V8 is cathode 1 (indicated by "ghost" arrow) and the position of S2 is position 4. W13 is of course connected to cathode 1 and cathode 2 is commoned with cathodes 3 to 9 inclusive.

Counting tube V8 is now driven from cathode 9 of V4 by connection at position 4 of bank 3, W5 and R9 in series, are connected over bank 1 position 4 to the midpoint of a coincidence circuit comprising R42, W17 and R43, W18. The arms of said coincidence circuit are connected through unidirectionally conducting devices W11 and W13 to the selected cathodes 3 and 2 of tubes V4 and V8 respectively.

After the usual initial procedure during which relay B (not shown) is energised, V2 starts as before on pressing of the operator's button which controls relay A.

Tube V4 starts when tube V2 stops and runs until its glow arrives on cathode 9. It is to be noted that during this run the glow pauses on V4 selected cathode 3 but is prevented from interrupting the process since any pulse over W11 fails to trigger V1 in the absence of a coincident potential on the R42, W17 arm of the coincidence circuit, contact A5 being open.

The arrival of the glow in V4 on cathode 9 is operable to step V8 from cathode 0 to cathode 1 by the signal which triggers V7 through bank 3 position 4.

On the second occasion that the discharge in V4 arrives on cathode 3, after 13 cycles of current have flowed in the welding transformer; the discharge which has remained on V8 selected cathode 1 and provided a continuing coincidence potential for the R42, W17 arm of the coincidence circuit and the discharge which puts a potential on the other arm R43, W18 sends a pulse over position 4 of bank 1, R9 and W5 to trigger V1 and step V2 once so destroying the coincidence for V4 which immediately stops. The counting tubes V2, V4 and V8 now have discharges standing on their 5th, 3rd and 1st cathodes respectively.

The reason that the coincidence potential for the R4, W4 arm of the coincidence circuit for V2 drive is taken, not from V4 cathode 0, but from V8 cathode 0 is that in "long spot" welding the discharge in V4 may rest on cathode 0 several times during a long "On" run (up to a maximum of 9 times) and the "Off" tube, V2, would be driven and the coincidence for the "On" tube, V4, destroyed.

When V8 is driven by the occurrence of a discharge on V4 cathode 9 it has been found necessary to switch in, for the purposes of "long spot" welding control, a capacitor C13 (shown dotted). The necessity arises because immediately the glow arrives on V4 cathode 9 the glow in V8 would move off its selected cathode. This would destroy the wanted coincidence potential for R43, W18 and R42, W17. The capacitor C13 maintains this potential for a time long enough for the "On" tube coincidence to be destroyed first by stepping the "Off" tube.

Figure 9:
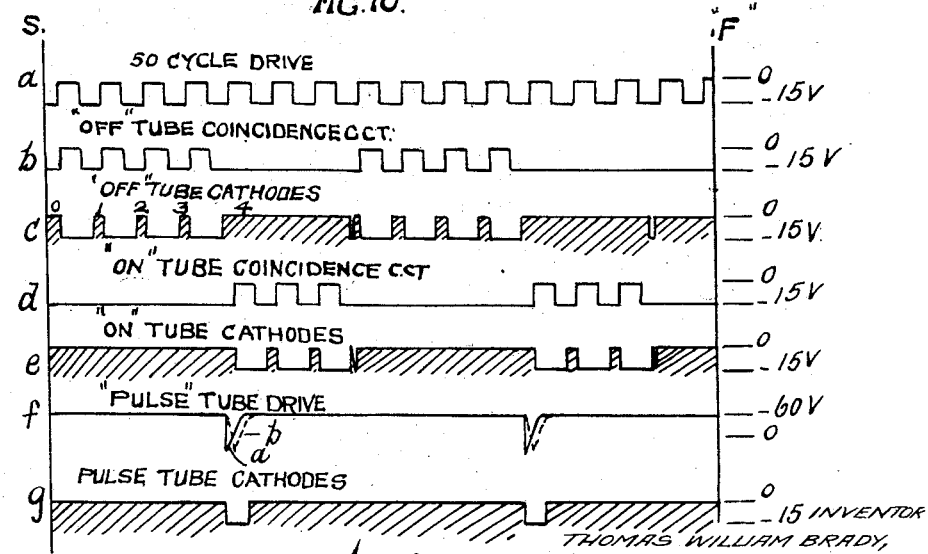

Fig. 9 is a diagram of the pulse sequences for the arrangement of Fig. 8 switched to position 1 to control "pulsation" welding in which (a) is the pulse train derived from the mains for the counting tube drives, (b) and (c), (d) and (e), (f) and (g) show the "Off" tube coincidence circuit and cathode potentials, the "On" tube coincidence circuit and cathode potentials and V8 tube drive and cathode potentials respectively to a common time scale. The sequence starts at "S" when the operator presses his button and finishes at "F" where the operating button is released.

Figure 10:
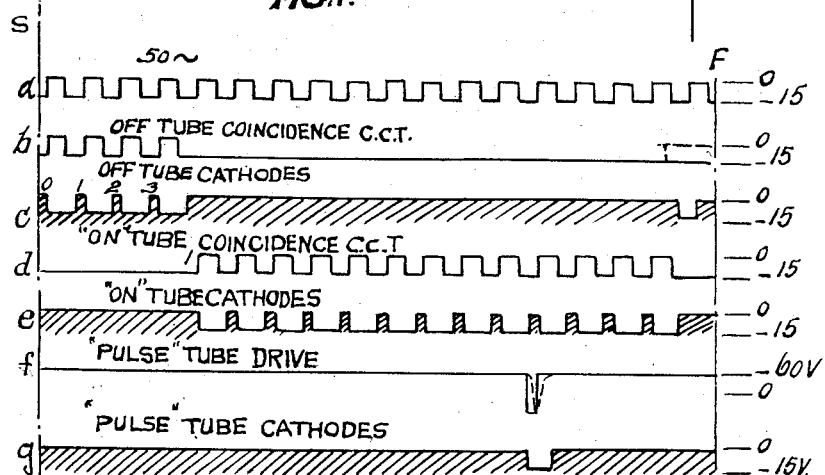

Fig. 10 similarly shows the sequence of coincidence circuit and counting tube conditions for "long spot" welding control performed by the arrangement of Fig. 8 curves (a) to (g) being equivalent to those in Fig. 9.

Figure 11:
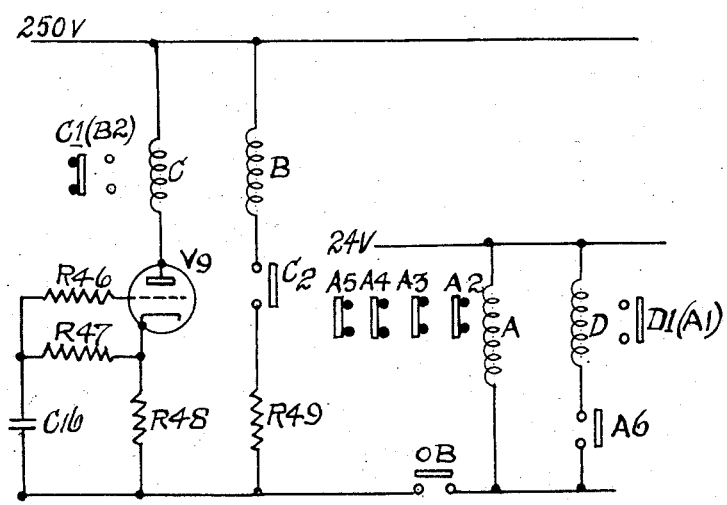

In the foregoing description it has been assumed in order to simplify the description that there are only two groups of contacts one each appended to a relay coil. Fig. 11 shows one practical arrangement whereby those contacts which are indicated as being contacts of a particular coil, A or B, but which are arranged to have precedence of operation over other contacts of the same coil are in fact contacts of third and fourth coil C and D.

For safety reasons the circuit brought out to the operator's button, footswitch or the like is shown to be energised from a low voltage D. C. supply.

When the mains switch is closed both portions of the operator's control circuit are fed with suitable values of potential. Valve V9 conducts sufficient current to operate coil C in its anode circuit after the delay occasioned by resistors R46, R47, R48 and capacitor C16. When relay C operates contact C1 (designated B2 in the previous description) changes over to cause the now familiar reset action of the counting tubes. Its other contact C2 energises coil B whereupon contacts B1, B3 and B4 close. The weld timing circuit is now ready to proceed.

When the operator closes his button OB relay A operates to open contacts A2, A3, A4, and A5 and to close contact A6. The closing of A6 energises relay D and so closes contact A1 but only after relay A's remaining contacts have operated. It will be obvious that mention of certain of the contacts included in the foregoing description is not relevant to the circuits of Figs. 2a and 2b, and 6a and 6b.

While the invention has been described with particular reference to three specific embodiments all of which are arranged for single phase operation it will be obvious to those skilled in the art that the application of digital counting and more particularly multicathode gas-filled glow discharge counting tubes to resistance welding control may also be applied to polyphase welding. For example the system in which the welding transformer has three primaries and a single secondary winding is known by the term "3 to 1 phase" or simply, three-phase welding and permits a more-or-less balanced load to be taken from a three-phase supply. The application of the type of control provided by the invention largely comprises the accommodation by the counting tubes and driving circuits from a supply having three times the basic frequency.

What I claim as new and desire to secure by Letters Patent of the United States is:

1. An apparatus comprising, in combination, an alternating current supply circuit, a load circuit energizable with current from said supply circuit, control means for controlling the current fed from said supply circuit to said load circuit, a pair of multicathode gas-filled glow discharge tubes, means for deriving electrical impulses from said supply circuit and means for feeding alternate groups of said impulses to a respective one of said pair of multicathode gas-filled glow discharge tubes, the groups counted by one of said tubes rendering said control means operative to allow current from the supply circuit to flow in the load circuit and the groups counted by the other of said tubes determining the duration between the groups counted by said one of said tubes.

2. In combination, an electrical load circuit, an alternating current supply circuit, means for energizing said load circuit from said supply circuit, means for deriving an electrical pulse train from said supply circuit, means for delaying the pulses of said train with respect to the phase of the current in said supply circuit, a first multi-cathode gas-filled glow discharge counting tube having means to step its discharge along its cathode array in response to a first predetermined number of said pulses from said phase-shifting means, a second multicathode gas-filled glow discharge counting tube having means to step its discharge along its cathode array in response to a predetermined second number of pulses from said phase-shifting means following said first number of pulses stepping the discharge in said first tube, a third multicathode gas-filled glow discharge counting tube having means to step its discharge from a first selected cathode to a second selected cathode in response to signals derived from a selected cathode of either said first or said second tube and means responsive to the pulses counted by said second tube for controlling said energizing means.

3. Electronic digital counting and controlling means comprising a source of alternating potential, means for controlling electric pulses from said source at the same frequency thereof, a first and second digital counter tubes, a first gate means for controlling the application of a preselected number of said pulses to said first counter, a second gate means for controlling the application of a pre-selected number of said pulses to said second counter, said first counter gate means connected to said second counter and arranged to be opened in response to a signal therefrom, said second counter gate means connected to said first counter and arranged to be opened in response to a signal therefrom, and control means responsive to the pulses applied to said first counter for periodically energizing an electric load from said source.

4. Electronic digital counting and controlling means comprising a source of alternating potential, a load circuit, means for controlling electric pulses from said source at the same frequency thereof, a first and a second digital counting devices, a first gate means for controlling the application of a pre-selected number of said pulses to said first counter, a second gate means for controlling the application of a pre-selected number of said pulses to said second counter, said first counter gate means connected to said second counter and arranged to be opened in response to a signal therefrom, said second counter gate means connected to said first counter and arranged to be opened in response to a signal therefrom, a third digital counting device, a third gate means for controlling the application of a pre-selected number of pulses to said third counter, said third counter gate means being opened in response to a combined predetermined condition of said first and second counters and means responsive to the pulses applied to said second counter for energizing means for controlling the application of current from said source to a load circuit.

5. In apparatus according to claim 3 multicathode gas-filled glow discharge tube means responsive to pulses derived from said first or second counter tubes, means to enable said second counter tube means to respond to a greater number of pulses from said source than the number of cathodes in said second counter tube means.

6. In combination, an alternating current supply circuit, a load circuit, means for deriving electrical pulses from said supply circuit, a first multicathode gas-filled glow-discharge counting tube having its discharge stepped along its cathode array in response to a first group of said pulses containing a selected number of said pulses, a second multicathode gas-filled glow-discharge counting tube having its discharge stepped along its cathode array in response to a second group of said pulses containing a selected number of said pulses, means responsive to termination of said first group of pulses for initiating the counting of said second group of pulses, means responsive to the termination of said second group of pulses for restoring said multicathode counting tubes to a zero position, and means for energising said load circuit from said supply circuit responsively to the pulses counted by said second tube.

7. In combination, an alternating current supply circuit, a load circuit, means for deriving electrical pulses from said supply circuit, a first multicathode gas-filled glow-discharge counting tube having its discharge stepped along its cathode array in response to a first group of said pulses containing a selected number of said pulses, a second multicathode gas-filled glow-discharge counting tube having its discharge stepped along its cathode array in response to a second group of said pulses containing a selected number of said pulses, means responsive to termination of said first group of pulses for initiating the counting of said second group of pulses, means responsive to the termination of said second group of pulses for restoring said multicathode counting tubes to a zero position and for initiating recounting by said first tube, and means for energising said load circuit from said supply circuit responsively to the pulses counted by said second tube.

8. In combination, an alternating current supply circuit, a load circuit, means for deriving electrical pulses from said supply circuit, a first multicathode gas-filled glow-discharge counting tube having its discharge adapted to be stepped along its cathode array in response to said pulses, a second multicathode gas-filled glow-discharge counting tube having its discharge adapted to be stepped along its cathode array in response to said pulses, means for applying said pulses to said counting tubes, biasing means for preventing said pulses from stepping the discharge in said tube, control switching means for removing the bias from said first tube whereby to cause its discharge to be stepped along its cathode array, means responsive to the arrival of the discharge on a selected cathode of said first tube for removing the bias from said second tube whereby the discharge in said second tube is stepped along its cathode array, means responsive to the arrival of the discharge on a selected cathode of said second tube for resetting said counting tubes to a zero position, and means responsive to the pulses counted by said second tube for energising said load circuit with a corresponding number of alternating pulses derived from said supply circuit.

References Cited in the file of this patent

UNITED STATES PATENTS

| | | |
|---|---|---|
| 2,403,873 | Mumma | July 9, 1946 |
| 2,518,118 | Bivens | Aug. 8, 1950 |
| 2,575,517 | Hagen | Nov. 20, 1951 |
| 2,679,978 | Kandiah | June 1, 1954 |

OTHER REFERENCES

Publication, A Combined Timer and Cycle Counter, by P. Huggins, Electronic Engineering, Dec. 1952.